US007198192B2

(12) United States Patent
Page et al.

(10) Patent No.: US 7,198,192 B2
(45) Date of Patent: Apr. 3, 2007

(54) WIRELESS MOBILE INSTANT PRODUCT PRICE COMPARISON AND PRODUCT REVIEW

(75) Inventors: Steven L. Page, Dallas, TX (US); Joe G. Farrell, Macomb, MI (US)

(73) Assignee: Electronic Data Systems Corporation, Plano, TX (US)

( * ) Notice: Subject to any disclaimer, the term of this patent is extended or adjusted under 35 U.S.C. 154(b) by 145 days.

(21) Appl. No.: 11/048,239

(22) Filed: Feb. 1, 2005

(65) Prior Publication Data

US 2006/0169772 A1 Aug. 3, 2006

(51) Int. Cl.
*G06K 5/00* (2006.01)
*G06K 15/00* (2006.01)
(52) U.S. Cl. ...................... 235/383; 235/380
(58) Field of Classification Search ..............................
235/462.01–462.25, 385, 436, 383, 375,
235/380, 492; 340/572.01, 10.1, 572.1; 705/23.1,
705/29
See application file for complete search history.

(56) References Cited

U.S. PATENT DOCUMENTS

| 2003/0033280 | A1* | 2/2003 | Van Den Hamer et al. ..... 707/1 |
| 2004/0046646 | A1 | 3/2004 | Eskridge |
| 2004/0128134 | A1 | 7/2004 | Sacks et al. |
| 2005/0064867 | A1 | 3/2005 | Nitta |
| 2005/0149414 | A1* | 7/2005 | Schrodt et al. ................ 705/29 |
| 2005/0230478 | A1* | 10/2005 | Chapman et al. ....... 235/462.13 |
| 2005/0231370 | A1* | 10/2005 | Tagato ...................... 340/572.1 |
| 2006/0032917 | A1* | 2/2006 | Ritter .......................... 235/385 |
| 2006/0144936 | A1* | 7/2006 | Rostosky .................... 235/383 |
| 2006/0144940 | A1* | 7/2006 | Shannon et al. ............. 235/385 |
| 2006/0149635 | A1* | 7/2006 | Bhatti et al. ................. 705/23 |
| 2006/0168644 | A1* | 7/2006 | Richter et al. ................. 726/2 |

FOREIGN PATENT DOCUMENTS

| GB | 2387465 A | 10/2003 |
| JP | 2004-054554 | 2/2004 |
| WO | WO 2006/035315 A1 | 4/2006 |

* cited by examiner

*Primary Examiner*—Thien M. Le
(74) *Attorney, Agent, or Firm*—Stephen R. Loe (57) ABSTRACT

A method, system, computer program product, and device for providing product information, such as, for example, product price comparison information, product reviews, retailer information, retailer reviews, and information about similar products, to a user utilizing a mobile data processing system is provided. In one embodiment, a user, using a product code reader, such as, for example, an RFID reader, reads a product code from a tag, such as, for example, an RFID tag, located proximate to a product. The product code information determined from the product code is transmitted to a server. The server receives the product code information and retrieves the product information from a database. The server then formats the product information into, for example, a web page, and transmits the web page back to the mobile data processing system which receives the web page and presents the web page to the user.

20 Claims, 6 Drawing Sheets

100
Network
Figure 1

WIRELESS MOBILE INSTANT PRODUCT PRICE COMPARISON AND PRODUCT REVIEW

CROSS REFERENCE TO RELATED APPLICATIONS

The present application is related to co-pending U.S. patent application Ser. No. 10/861,026 entitled "MOBILE INSTANT PRODUCT PRICE COMPARISON AND PRODUCT REVIEW" filed Jun. 4, 2004. The content of the above mentioned commonly assigned, co-pending U.S. Patent application is hereby incorporated herein by reference for all purposes.

BACKGROUND OF THE INVENTION

1. Technical Field

The present invention relates to computer software and, more particularly to a method, system, and computer software for providing product price comparison and other information to a mobile computing device.

2. Description of Related Art

One problem frequently encountered by shoppers when perusing the aisled of retail establishments is the ability to instantly determine whether a particular product is a good value. Currently, in order to determine the best brand and model of a product and the location of the retailer having the best price for the product, a consumer must utilize a number of different resources and/or travel to several stores in order to find the appropriate product for the customer's needs and the best available price. For example, the consumer may need to consult one or more web sites to access customer reviews of products to determine whether a product meets the needs of the individual consumer. The consumer may then wish to view an actual physical embodiment of the product rather than merely trusting the pictorial representation presented over the internet. This requires the consumer to visit at least one retail outlet, by which time, the consumer may have forgotten or misplaced the detailed product reviews accessed via the Internet.

Furthermore, if the user wishes to compare prices, the user may need to visit several retail chains and/or visit one or more price comparison web sites available on the internet to determine which retailer has the best price for the product under consideration. Currently, there exist web sites that provide price comparison and product reviews. However, there are currently no systems that provide a user to automatically provide product information to a web site and to receive, at a mobile computing device, product price comparison, product reviews, retailer information, and/or other product information in real time or near real time. Therefore, it would be desirable to have a system that allows a user to locate a product in a retail establishment and automatically send the product information to a web site and receive back product price comparisons, product reviews, retailer information, and/or other product information in real time.

SUMMARY OF THE INVENTION

The present invention provides a method, system, computer program product, and device for providing product information, such as, for example, product price comparison information, product reviews, retailer information, retailer reviews, and information about similar products, to a user utilizing a mobile data processing system, such as, for example, a personal digital assistant (PDA). In one embodiment, a user, using a product code reader, such as, for example, an RFID reader, reads a product code from a tag, such as, for example, an RFID tag, located proximate to a product. The product code information determined from the product code is transmitted to a server. The server receives the product code information and retrieves the product information from a database. The server then formats the product information into, for example, a web page, and transmits the web page back to the mobile data processing system which receives the web page and presents the web page to the user. In addition, in some embodiments, a Global Positioning System (GPS) is utilized in order to determine, for example, driving directions to a competing store when it is determined that another store is selling the same or similar product for a lower price or otherwise better terms.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
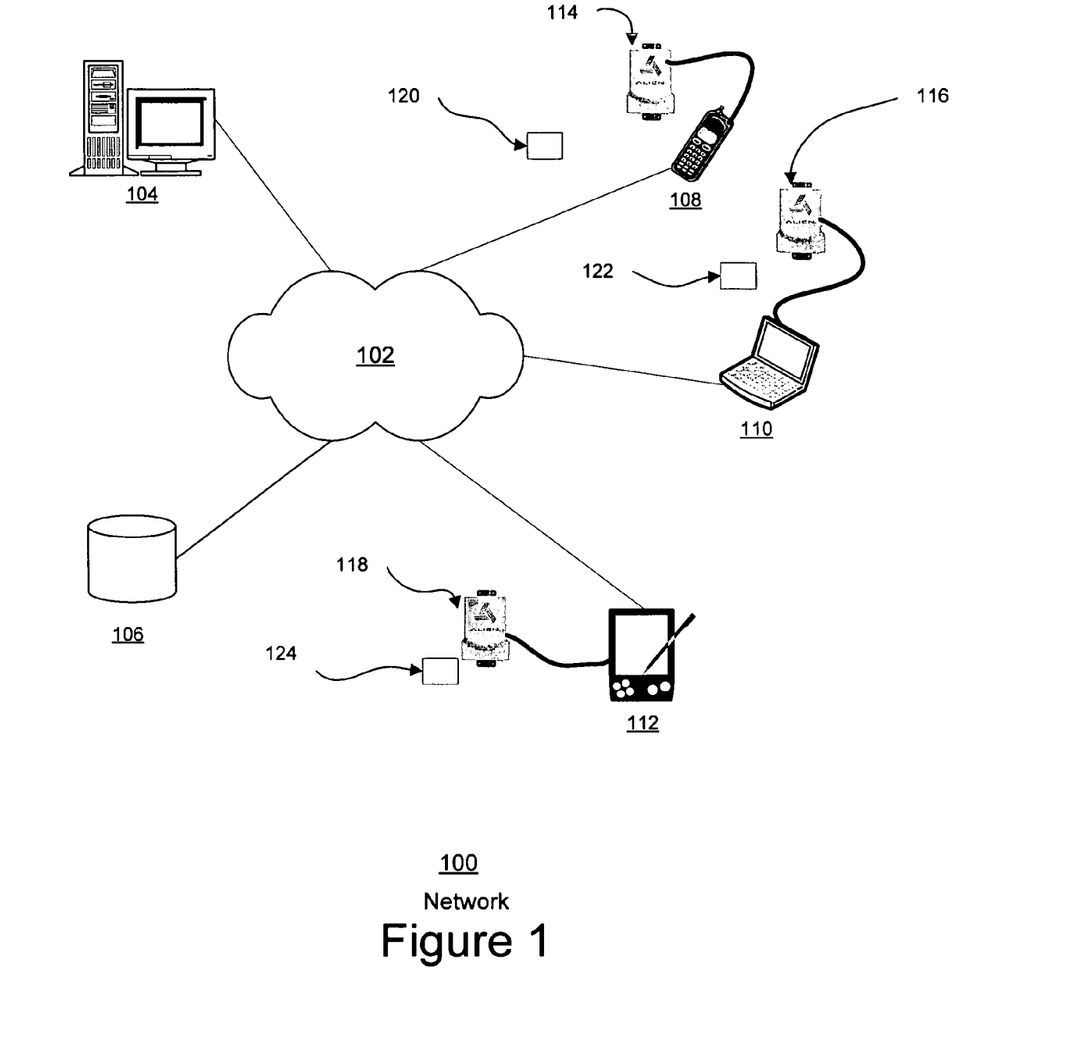
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. In the depicted example, client 108 is a smartphone, client 110 is a laptop computer, and client 112 is a personal digital assistant (PDA). However, these clients, 108, 110 and 112, may take the form of other portable data processing systems as well.

Each of the clients 108–112 is connected to a respective product identification scanner 114–118. The scanners 114–118 may scan a product identifier 120–124 (e.g., a radio frequency identification (RFID) tag or a Universal Product Code (UPC) barcode) of an item/product that a user finds in a store and is considering purchasing. The product identifier 120–124 contains at, a minimum, sufficient information to uniquely identify the product type, brand, and size. The product identifier information is then sent by the client 108–112 to a server 104 via network 102. The clients 108–112 may also send information indicating the format (e.g., Wireless Markup Language (WML) or Hypertext Markup Language (HTML)) in which the client wishes to receive data from the server 104, thus ensuring that the data is received in a format that is readable by the client 108–112 and presentable to the user based on the limitations of data output and display that are present for the particular client 108–112.

Server 104 then retrieves product reviews, retail outlet information, price comparisons for a plurality of retail outlets, and/or other product information for the item based on the product identifier information scanned by the user. Other product information may include the identities of similar items, the price of the similar item at various retail establishments, and product reviews for the similar product, thereby allowing the customer to do comparison shopping without the need of visiting several retail establishments.

Storage unit 106 may contain information related to product reviews for various products, wherein the information is formatted in such a manner as to enable the information to be retrieved based on barcode information as well as to be correlated based on type. For example, if product identifier information corresponding to a particular brand and model of CD players is received, the server 104 may retrieve information about other CD players from storage unit 106 and provide this information to the user as well, thereby allowing the user to do instant price and product comparison.

Storage unit 106 may also contain pricing information for a product from a variety of retail outlets. The pricing information may be obtained via an agreement with each retail establishment to provide pricing information to the server 106 for each product carried by the retail establishment and to update the pricing information whenever the price for an item changes. Incentive for retail establishments to participate in a product price comparison and product review system according to the present invention is provided by the fact that the present invention may bring customers to the retailer that might otherwise not purchase from the retailer. Retail establishments which do not update their prices on storage unit 106 sufficiently quickly after the price has changed or that post deliberatively misleading or false information may be removed from the database thereby providing the retailers with incentive to provide accurate and timely information thereby enabling a user to utilize the most current information available when making a purchase decision. Storage unit 106 may also include retailer reviews which may also be correlated to product identifiers such that only reviews of retailers that carry the product corresponding to the barcode received by server 104 from a respective one of clients 108–112 are presented to the user. In an alternative embodiment, server 104 may retrieve some information from storage unit 106, but may collect other information, such as, for example, pricing information, from the various retail establishments at the time the request is received in order to ensure that the price comparison information is up to date. One skilled in the art will recognize that other methods of collecting, storing and presenting price and other product information may be utilized as well.

The retail outlet information may include customer reviews for retail establishments which may indicate, for example, user satisfaction with customer service for the respective retail establishment and benefits of using one retailer as opposed to another retailer. This information may be divided into comments related to the retail establishment generally and as it pertains to the particular product that the user has scanned. The reviews of the product may include customer reviews as well as reviews published by professional critics. The product and retailer reviews may be stored in database 106 and correlated to the product barcode.

The appropriate product review, price comparison data, and product data may be obtained, for example, by approaching UPC or RFID database owners, price comparison web site owners, review web site owners and obtaining agreements with each of these organizations to access their data. Alternatively, mechanisms for receiving product reviews and/or retailer reviews may be maintained on server 104 and obtained directly from customers. Appropriate incentives may be provided to customers to induce them to write reviews and disincentives may also be provided in order to discourage customers from writing false reviews.

Once all of the appropriate information has been obtained, the server 104 then creates a web page containing this information and transmits the web page(s) containing product price comparison and product reviews to clients 108–112. The web page may be created, for example, using a Wireless Markup Language (WML) that is conducive to transmission to and display on wireless devices with limited viewing areas and/or bandwidth for receiving information or may be created using Hypertext Markup Language (HTML) or an Extensible Markup Language (XML) as suitable for the requesting device. However, the particular protocol for creating the web page is not critical. Furthermore, in some embodiments, it is not necessary to create a web page prior to transmission of the information to the client 108–112: in such embodiments, the information is merely encoded in a format that is recognizable by the client 108–112 which then presents it to the user in a format selected by the user.

Thus, the user receives current product pricing information, product reviews, and retailer reviews in real time (or near real time) thereby enabling the user to make an informed decision as to whether to purchase the product at that time from the particular retail establishment from within which the user happens to be shopping or to visit another retailer, either through the retailer's brick and mortar store or on-line via the Internet and purchase from this other retailer based on information received in the product price comparison, product reviews, and/or retailer reviews. The user may also scan two or more similar products, receive product reviews and price comparison information for each, and then decide which of the two items to purchase.

In some embodiments, the mobile data processing systems 108–112 may also include a Global Positioning System (GPS). The GPS unit may enable the user, once the product price comparison and other product information has been received from the server, to determine which of the other stores that sell the product for less (if there are any) is nearest to the user. Furthermore, the user may use the GPS unit in combination with the address of other stores to have maps constructed and displayed illustrating how the user can get to another store from the user's present location. Thus, in addition to providing the user with product and price comparison information, the user is provided with aids for navigating to another store if so desired.

Distributed data processing system 100 may include additional servers, clients, and other devices not shown. Furthermore, although the scanners 114–118 are depicted as separate equipment from clients 108–112, in some embodiments, the clients 108–112 may incorporate a scanner within the physical embodiment of the client 108–112 itself.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

Turning now to a more detailed description of radio frequency identification transmitters and readers as used herein to describe the present invention, radio frequency identification, or RFID, is a generic term for technologies that use radio waves to automatically identify people or objects. There are several methods of identification, but the most common is to store a serial number that identifies a person or object, and perhaps other information, on a microchip that is attached to an antenna (the chip and the antenna together are called an RFID transponder or an RFID tag). Any one of product identifiers 120–124 could be implemented as an RFID tag. The antenna enables the chip to transmit the identification information to a reader. The reader, such as, for example, any one of scanners 114–118, converts the radio waves reflected back from the RFID tag into digital information that can then be passed on to computers that can make use of it.

Thus, an RFID system consists of a tag, which is made up of a microchip with an antenna, and an interrogator or reader with an antenna. The reader sends out electromagnetic waves. The tag antenna is tuned to receive these waves. A passive RFID tag draws power from field created by the reader and uses it to power the microchip's circuits. The chip then modulates the waves that the tag sends back to the reader and the reader converts the new waves into digital data.

FIG. 1 is intended as an example and not as an architectural limitation for the processes of the present invention.

Figure 2:
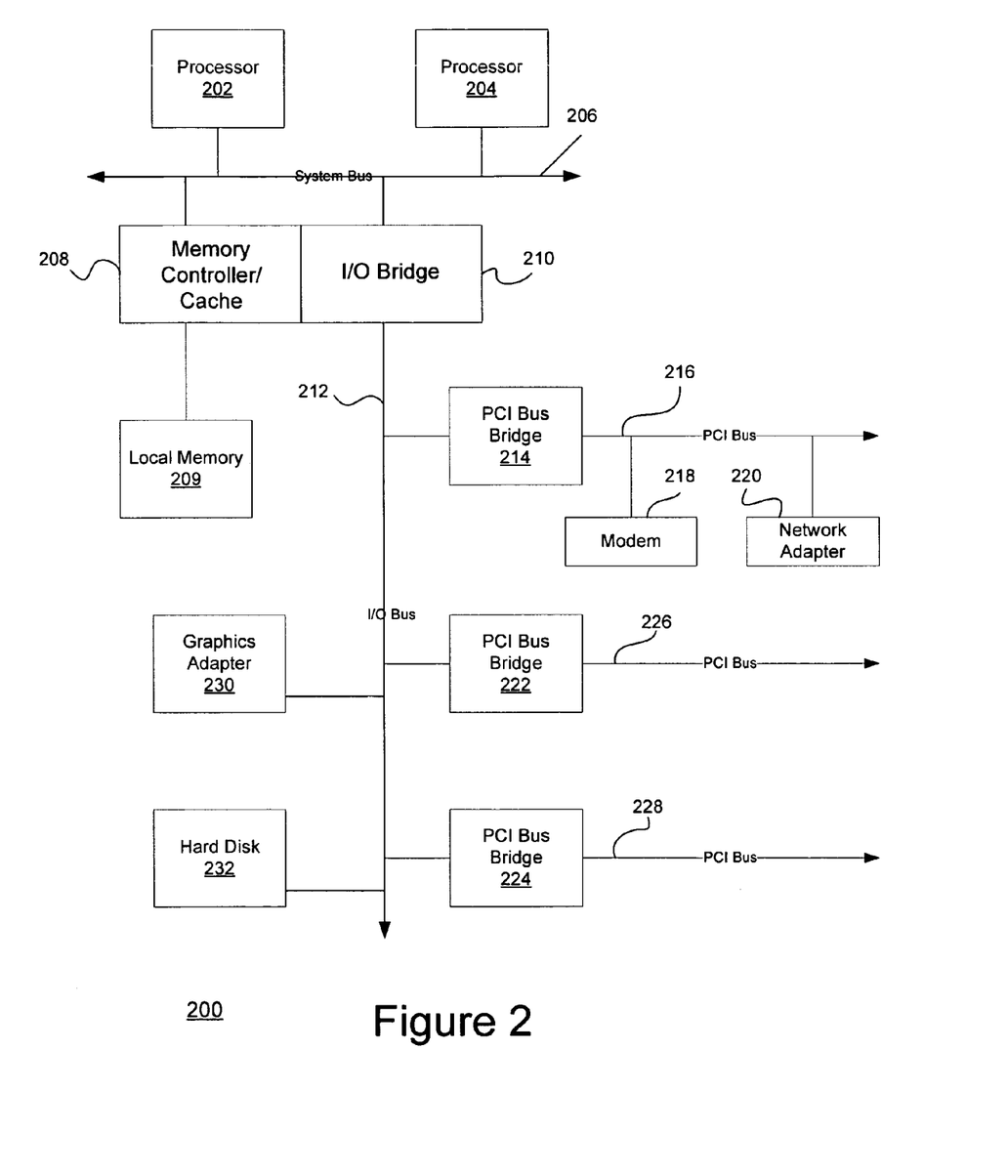
FIG. 2 depicts a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network data processing systems 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Sever 200 also contains instructions (which may be stored in hard disk 232, loaded into memory 209 and executed by processors 202 and 204) for receiving product review/price comparison requests from clients based on a products identification information (such as might be retrieved from an RFID or a UPC), retrieving relevant information either from storage or from the Internet, formatting a web page with the relevant information, and transmitting the web page back to the requesting client. Thus, server 200 provides a repository and mechanism for obtaining and providing product price comparisons, product reviews, and/or retailer information to clients utilized by customers browsing products within a physical retail store location.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries With reference now to FIG. 3, a block diagram of a portable data processing system in which the present invention may be implemented is illustrated. Data processing system 300 is an example of a portable client computer, such as, for example, laptop 110 depicted in FIG. 1. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

Figure 3:
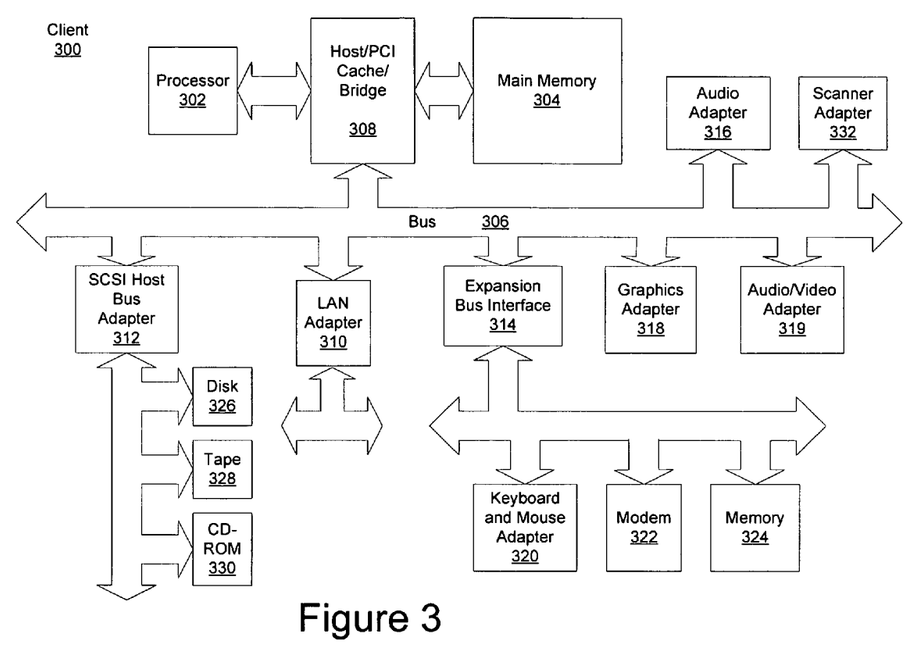
FIG. 3 depicts a block diagram of a portable data processing system in which the present invention may be implemented.

Additionally, a scanner adapter 332 is connected to PCI local bus 306. Scanner adapter 332 allows for a RFID reader/scanner or other product identification reader, such as a barcode reader, to be connected to data processing system 300 thereby allowing product identification information scanned by a scanner to be received by data processing system 300 and transmitted to a server in order to receive product price comparison information, product reviews, retailer information, and/or other product information from the server.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs for scanning barcodes, transmitting the barcode information to a web site, and receiving and displaying a web page providing product price comparison, product reviews, retailer information, and/or other product information are located on a storage device, such as hard disk drive 326, and may be loaded into main memory 304 for execution by processor 302.

Data processing system 300 may also include a GPS unit (not shown). The GPS unit may enable the data processing system to determine its location and, in conjunction with information received from a server, may, for example, be used to create and present maps and/or driving directions to other stores or locations where a product may be found for a lower price. Alternatively, data processing system 300 may include an I/O port for connecting an external GPS unit to the data processing system 300.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
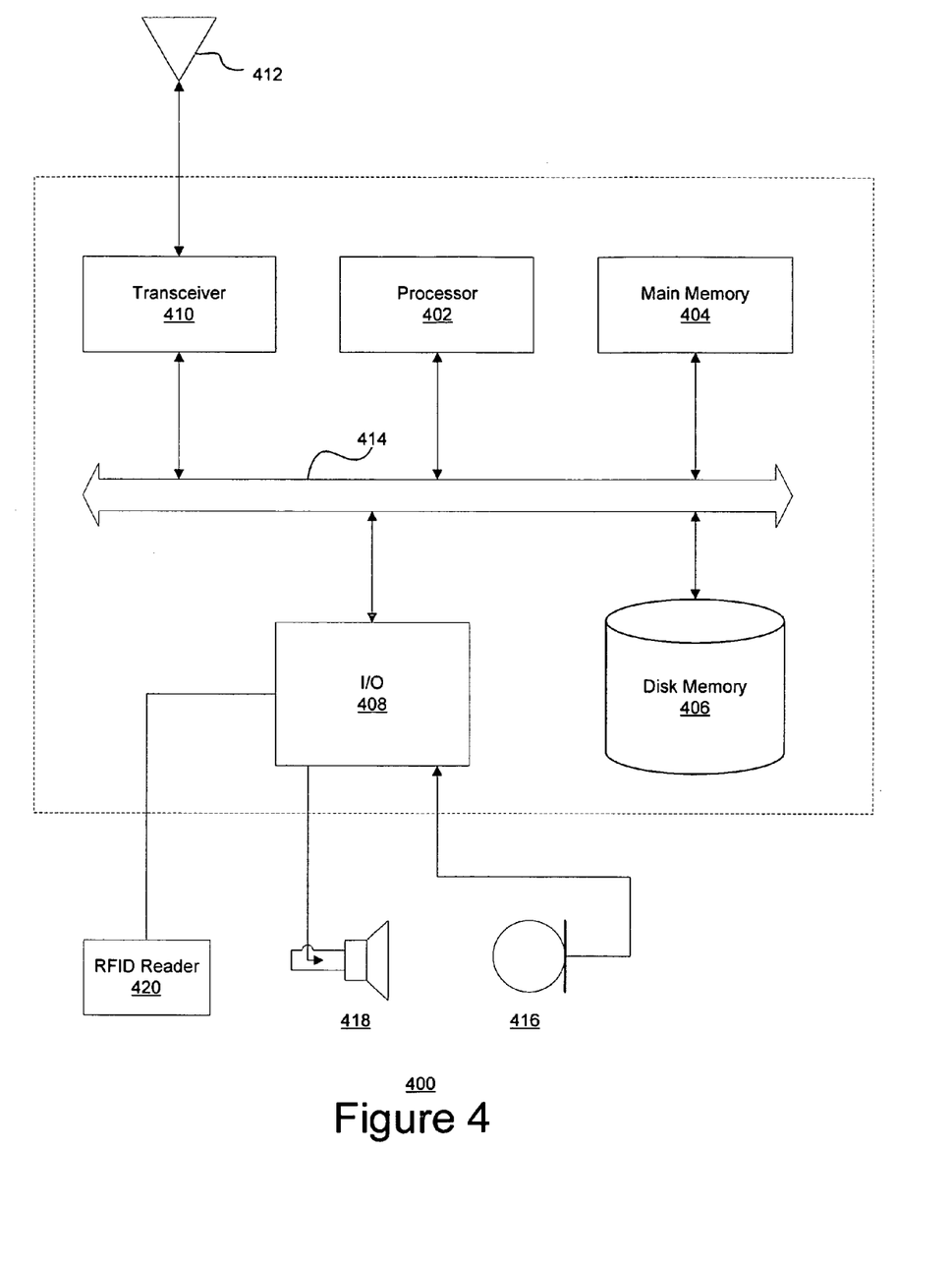
FIG. 4 depicts a block diagram of a personal digital assistant (PDA) with product identification scanner in which the present invention may be implemented.

Turning now to FIG. 4, a block diagram of a personal digital assistant (PDA) is illustrated in which the present invention may be implemented. A PDA is a data processing system (i.e., a computer) which is small and portable. The PDA is typically a palmtop computer or smartphone, such as, for example, a Treo™ 600, a product and registered trademark of PalmOne, Inc. in Milpitas, Calif., which may be connected to a wireless communications network and which may provide voice, fax, e-mail, Internet access and/or other types of communication. An operating system, such as, for example, The PDA 400 may perform other types of facilities to the user as well, such as, for example, provide a calendar and day planner. PDA 400 is an example of a PDA or smartphone that may be implemented as, for example, PDA 112 or smartphone 108 depicted in FIG. 1.

PDA 400 may have one or more processors 402, such as a microprocessor, a main memory 404, a disk memory 406, and an I/O 408 such as a mouse, keyboard, or pen-type input, and a screen or monitor. The PDA 400 also has a wireless transceiver 410 connected to an antenna 412 configured to transmit and receive wireless communications to and from, for example, the Internet. The processor 402, memories 404, 406, I/O 408, and transceiver are connected to a bus 404. The bus transfers data, i.e., instructions and information, between each of the devices connected to it. The I/O 408 may permit faxes, e-mail, or optical images to be displayed on a monitor or printed out by a printer. The I/O 408 may be connected to a microphone 416 and a speaker 418 so that voice or sound information may be sent and received.

A product identification scanner 420 is also be connected to the PDA 400 through I/O 408 allowing a user to scan product identification information, such as, for example, RFID tags, of products found in the store. As depicted, the scanner 420 is an RFID scanner. However, any type of scanner is possible consistent with the type of product identification tag that is being scanned. For example, if a UPC code is utilized, then a barcode scanner would be connected to the PDA 400.

The scanner 420 may be integrated into the physical design of the PDA 400 or maybe an external handheld device connected to the PDA via a cable or wirelessly. The barcode information is then wirelessly sent to a web site via transceiver 410. The web site then identifies the item associated with the product identification information and creates a web page formatted, for example, in a Wireless Markup Language (WML), containing product price comparisons, product reviews, and/or retailer information. The retail outlets for which information is provided may include Internet only stores as well as brick and mortar stores and any combination thereof. This web page is then sent to the PDA 400 thereby allowing the user to intelligently make a decision as to whether to purchase the particular item scanned.

In addition to price comparison information and product reviews, the web page may contain information about warranties, rebates, and other incentives offered by various retailers or the product manufacturer as well as customer comments regarding their experiences with purchases with the various retail outlets presented in the price comparison. Thus, a user may be able to determine which retailers have hassle free return processes, hassle free exchanges, and are generally consumer friendly and which retailers have posed problems for consumers regarding the purchase of this particular item in the past and which retailers have posed problems for consumers generally.

Those of ordinary skill in the art will appreciate that the hardware in FIG. 4 may vary depending on the implementation. For example, PDA 400 may be enabled as a wireless telephone as well as a wirelessly enabled personal digital assistant. The depicted example is not meant to imply architectural limitations with respect to the present invention. Furthermore, PDA 400 may also include a GPS unit or means for coupling a GPS unit to the PDA 400 in order to facilitate acquiring driving directions, maps or other positional information useful in physically locating a competing store selling a product for a lower price or that has other advantages.

Figure 5:
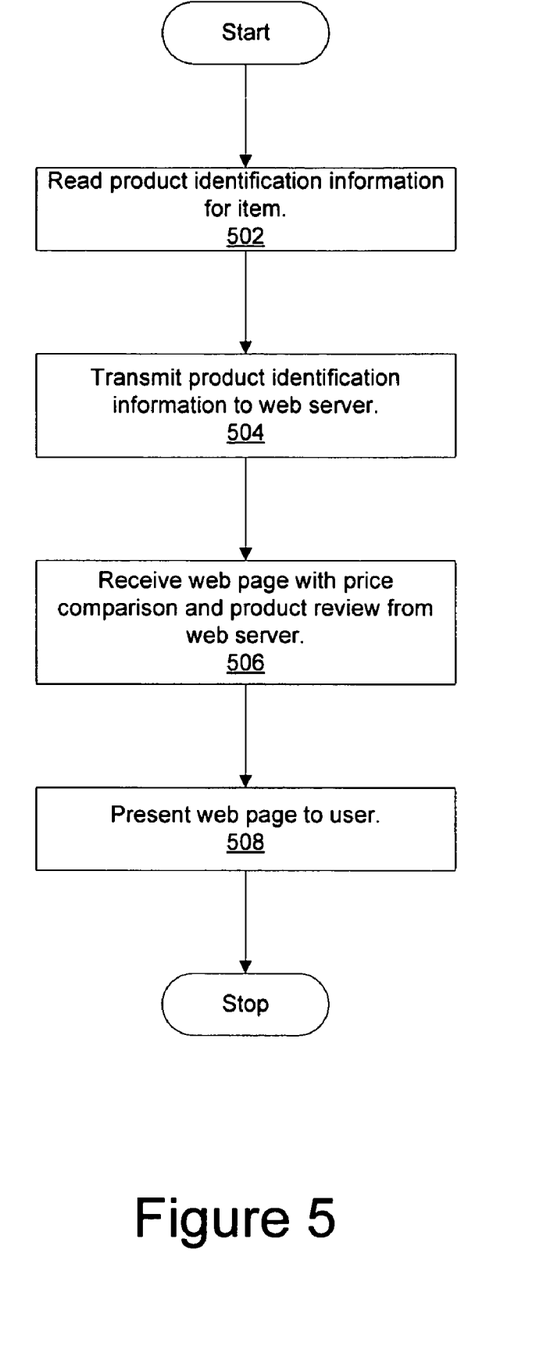
FIG. 5 depicts an exemplary diagram illustrating program function and process flow for scanning and transmitting product identification information and receiving product/retailer information in accordance with one embodiment of the present invention.

With reference now to FIG. 5, a diagram illustrating an exemplary program function and process flow for scanning and transmitting product identification information and receiving product/retailer information is depicted in accordance with one embodiment of the present invention. A user in a retail establishment begins the process of receiving real time product price comparison, product reviews, and/or retailer reviews by scanning the product identification information (e.g., an RFID) of a product in the retail establishment using a scanner coupled to a wirelessly enabled internet ready mobile data processing system (step 502). The mobile data processing system coupled to the barcode scanner transmits the barcode information to a server via the internet (step 504). Once the server has created a web page with product price comparison, product reviews, and/or retail information and transmitted it, the mobile data processing system receives the web page (step 506). The mobile data processing system then presents the web page containing the product price comparison, product review, and retailer information to the user (step 508).

Figure 6:
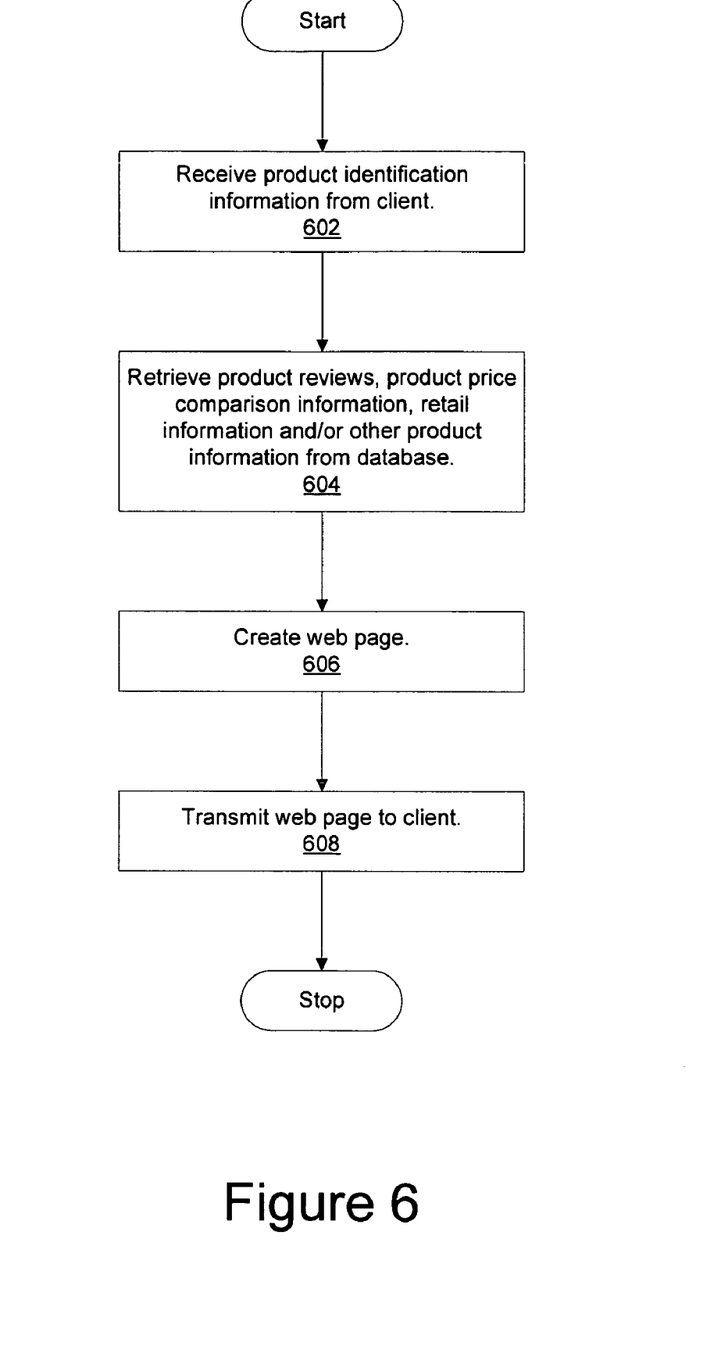
FIG. 6 depicts a diagram illustrating an exemplary process flow and program function for receiving product identification information and creating and sending a web page containing product price comparison, product reviews, retailer information, and/or other product information to a mobile computing device in accordance with one embodiment of the present invention.

With reference now to FIG. 6, a diagram illustrating an exemplary process flow and program function for receiving product identification information and creating and sending a web page containing product price comparison, product reviews, retailer information, and/or other product information to a mobile computing device is depicted in accordance with one embodiment of the present invention. The server receives product identification information from the mobile client (step 602). The server then retrieves the product reviews, product price comparison information, retailer information, and/or other product information from a database (step 604). The server then creates a web page containing the requested information concerning the product corresponding to the received product identification information and formats the web page in a format compatible with the requirements of the requesting mobile data processing system (e.g., WML, HTML, and XML) (step 606). The server then transmits the web page to the client (step 610).

In order to better understand the mobile product price comparison and product review system of the present invention, consider the following scenario. Suppose you are shopping for lawnmowers at Wal-Mart. You find a Grass-Cut2000 for $199. Is this a good deal? Is this a good mower? It has all the features you are looking for and the price sounds reasonable.

However, before you make the purchase, you take out your Palm Pilot with the attached product identification scanner and scan the GrassCut2000's product identification information tag, such as, for example, its RFID or its barcode. The custom application on your Palm Pilot quickly connects to a web site, matches the product identification information in a product ID database and identifies the product as a GrassCut2000 model year 2003. The Palm Pilot application then takes this data and connects to a pricing database. The then application connects to a review database. All of this within seconds, the application displays on your palm pilot that it has found the same mower at Target on sale for $169. The application has also returned a compilation of user reviews on the mower; the general consensus is that the mower is junk, rated 2 out of 5 stars.

However, the application has also scoured the reviews database and matched an alternative make & model with similar features, rated 4.5 out of 5 stars, and is priced at $180 at Costco. Thus, the present invention provides you with the ability, that while shopping at any store, you may scan any product and know instantly whether the price the store is asking is a reasonable price and whether the product you are looking at is thought of as a quality product by others—with alternative product suggestions available. Furthermore, all of this may be done in a matter of seconds depending on the bandwidth available to the user.

It should be noted that while the present invention has been described primarily with reference to products containing bar codes, such as, for example, UPC codes, the present invention is not limited to bar codes, but may be utilized with any type of product encoding labeling system. The coding system need not be a bar code, but may be a pattern or comprise characters. Furthermore, the examples of particular types of information (e.g., product price comparison, product reviews, and information about similar products) provided to the user that that have been presented herein have been presented merely as examples. Those skilled in the art will recognize that there are limitless possibilities as to what types of information may be transmitted to the user. Therefore, the present invention is not limited to transmission of the information corresponding to the particular examples provided herein.

The present invention has been described primarily with reference to RFID and UPC barcode technologies. However, it should be noted that the present invention is not limited to these technologies but may encompass any optical, radio frequency, or other technology for encoding product identification information onto a product. Therefore, the present invention is not limited to RFID or barcode technologies. It should also be noted that although the product identification reader, such as an RFID reader or barcode reader has been described and depicted primarily as a separate unit coupled to a data processing system, that the product identification reader may be incorporated into the data processing system as a single unit in some embodiments.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for receiving product information at a mobile data processing system, the method comprising:
    reading a product code from a tag located proximate to a product;
    transmitting the product code information determined from the product code to a server; and
    receiving product comparison information from the server, wherein the product comparison information comprises one of consumer information related to similar products and consumer information about the same product as offered by other retailers.

2. The method as recited in claim 1, wherein the product code is encoded using a radio frequency identification tag.

3. The method as recited in claim 1, wherein reading a product code comprises reading via radio frequency means a product code transmitted by the tag.

4. The method as recited in claim 1, wherein the product comparison information comprises at least one of product price comparison information, product reviews, retailer information, retailer reviews, and information about products similar to the product associated with the product code.

5. The method as recited in claim 1, wherein the product comparison information received from the server is formatted as a web page.

6. The method as recited in claim 1, further comprising:
determining a location of a competing store; and
presenting information useful in navigating to the competing store.

7. A computer program product in a computer readable media for use in a data processing system for receiving product information at a mobile data processing system, the computer program product comprising:
first instructions for reading a product code from a tag located proximate to a product;
second instructions for transmitting the product code information determined from the product code to a server; and
third instructions for receiving product comparison information from the server, wherein the product comparison information comprises one of consumer information related to similar products and consumer information about the same product as offered by other retailers.

8. The computer program product as recited in claim 7, wherein the product code is encoded using a radio frequency identification tag.

9. The computer program product as recited in claim 7, wherein the first instructions for reading a product code comprises reading via radio frequency means a product code transmitted by the tag.

10. The computer program product as recited in claim 7, further comprising:
first instructions for determining a location of a competing store; and
second instructions for presenting information useful in navigating to the competing store.

11. A system for receiving product information at a mobile data processing system, the system:
first means for reading a product code front a tag located proximate to a product;
second means for transmitting the product code information determined from the product code to a server; and
third means for receiving product comparison information from the server, wherein the product comparison information comprises one of consumer information related to similar products and consumer information about the same product as offered by other retailers.

12. The system as recited in claim 11, wherein the product code is encoded using a radio frequency identification tag.

13. The system as recited in claim 11, wherein the first means for reading a product code comprises reading via radio frequency means a product code transmitted by the tag.

14. The system program product as recited in claim 11, further comprising:
first means for determining a location of a competing store; and
second means for presenting information useful in navigating to the competing store.

15. A portable wireless data processing system for retrieving product and comparison information; comprising:
a reader for reading product identification information from a identification tag proximate to a product;
a transmitter for the product identification information to a remote location; and
a receiver for receiving product comparison information from the remote location, wherein the product comparison information comprises one of consumer information related to similar products and consumer information about the same product as offered by other retailers.

16. The portable wireless data processing system as recited in claim 15, wherein the reader is an optical scanner.

17. The portable wireless data processing system as recited in claim 15, wherein the reader is a radio frequency reader.

18. The portable wireless data processing system as recited in claim 15, wherein the reader is a RFID reader.

19. The portable wireless data processing system as recited in claim 15, wherein the product comparison information comprises at least one of product price information, product reviews, and product comparison information.

20. The portable wireless data processing system as recited in claim 15, further comprising:
a global positioning system unit for determining the location of a user and aiding in determining directional information to competing sellers of the product.

* * * * *